(12) United States Patent
Dzieciol et al.

(10) Patent No.: US 11,136,904 B2
(45) Date of Patent: Oct. 5, 2021

(54) METHOD OF INSTALLING A TURBINE ASSEMBLY USING A MODULAR SUPPORT MEMBER

(71) Applicant: General Electric Company, Schenectady, NY (US)

(72) Inventors: Piotr Krzysztof Dzieciol, Mazowieckie (PL); Sean Cornelius O'Meara, Schenectady, NY (US); Adrian Adam Klejc, Mazowieckie (PL); Szymon Perkowski, Mazowieckie (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 99 days.

(21) Appl. No.: 16/093,549

(22) PCT Filed: May 20, 2016

(86) PCT No.: PCT/PL2016/050023
§ 371 (c)(1),
(2) Date: Oct. 12, 2018

(87) PCT Pub. No.: WO2017/200404
PCT Pub. Date: Nov. 23, 2017

(65) Prior Publication Data
US 2019/0128145 A1 May 2, 2019

(51) Int. Cl.
*F01D 25/28* (2006.01)
*F16M 11/28* (2006.01)
(52) U.S. Cl.
CPC .......... *F01D 25/285* (2013.01); *F16M 11/28* (2013.01); *F05D 2230/51* (2013.01); *F05D 2230/68* (2013.01)

(58) Field of Classification Search
CPC ... F01D 25/285; F16M 11/28; F05D 2230/51; F05D 2230/68; Y10T 29/4932; Y10T 29/49318
See application file for complete search history.

(56) References Cited

U.S. PATENT DOCUMENTS

| 1,362,630 A | 12/1920 | Lafrance |
| 1,455,571 A | 5/1923 | Cleland |

(Continued)

FOREIGN PATENT DOCUMENTS

| DE | 3834135 A1 | 4/1991 |
| EP | 147308 A2 | 7/1985 |

(Continued)

OTHER PUBLICATIONS

English Machine Translation of JP2004238188A, Masayuki et al., Published Aug. 26, 2004.*

(Continued)

*Primary Examiner* — Sarang Afzali
(74) *Attorney, Agent, or Firm* — Armstrong Teasdale LLP

(57) ABSTRACT

A method of installing a turbine assembly is provided. The method includes assembling a support member for supporting a turbine assembly during installation. The support member includes a platform having a plurality of modular platform components oriented to define an upper surface of the platform. The method also includes positioning a linear actuator on the upper surface of the platform. The method further includes positioning a column on the linear actuator. The method includes lifting the turbine assembly onto the column. The platform, the linear actuator, and the column are sized to support the turbine assembly.

12 Claims, 6 Drawing Sheets

(56) References Cited

U.S. PATENT DOCUMENTS

| | | |
|---|---|---|
| 2,838,278 A | 6/1958 | Tarbet |
| 3,063,670 A | 11/1962 | Young |
| 4,174,095 A | 11/1979 | Chipman |
| 4,460,158 A | 7/1984 | Chiesa et al. |
| 4,787,600 A | 11/1988 | Bode |
| 5,299,653 A | 4/1994 | Nebel |
| 5,379,987 A | 1/1995 | Cleary |
| 5,865,270 A | 2/1999 | Strength et al. |
| 6,135,695 A | 10/2000 | Kindem et al. |
| 6,708,395 B2 | 3/2004 | Pezzano et al. |
| 7,063,307 B2 | 6/2006 | Williams, Sr. |
| 7,188,842 B2 | 3/2007 | Thorpe |
| 8,201,807 B2 * | 6/2012 | Hernandez, Jr. ......... B66F 3/30 254/133 R |
| 2007/0114500 A1 | 5/2007 | Hernandez, Jr. |
| 2009/0008917 A1 | 1/2009 | Daniel |
| 2009/0179122 A1 | 7/2009 | Inzero |
| 2010/0218508 A1 | 9/2010 | Brown |
| 2012/0090925 A1 | 4/2012 | White et al. |
| 2015/0137052 A1 | 5/2015 | Dekeuster et al. |

FOREIGN PATENT DOCUMENTS

| | | |
|---|---|---|
| JP | S4838114 Y1 | 11/1973 |
| JP | H0921726 A | 1/1997 |
| JP | 2003106171 A | 4/2003 |
| JP | 2004238188 A | 8/2004 |
| JP | 201207514 A | 6/2012 |
| JP | 201210514 A | 6/2012 |
| JP | 2016188639 A | 11/2016 |
| WO | 2009005818 A2 | 1/2009 |
| WO | 2016059468 A1 | 4/2016 |

OTHER PUBLICATIONS

International Search Report and Written Opinion issued in connection with corresponding WO filing No. PCT/PL2017/0250023 dated Jan. 31, 2017.

* cited by examiner

METHOD OF INSTALLING A TURBINE ASSEMBLY USING A MODULAR SUPPORT MEMBER

BACKGROUND

The field of this disclosure relates generally to support members and, more particularly, to a support member for use with a turbine assembly.

At least some known turbine assemblies are installed on a frame that is erected from a foundation. Due to the large size of at least some known turbine assemblies, it is common to install a turbine assembly on a frame by first lifting the turbine assembly onto adjustable brackets (e.g., fixators) that project above the frame, and then lowering the turbine assembly onto the frame using the brackets. However, it can be difficult for the crane operator to accurately position the turbine assembly on the brackets, in that the crane operator visually aligns the turbine assembly with the brackets when lowering the turbine assembly onto the brackets. It is therefore common for the turbine assembly to be somewhat misaligned when lowered onto the brackets, and greater degrees of misalignment can result in damage to the turbine assembly, the brackets, and/or the frame, which may significantly delay the overall installation schedule.

BRIEF DESCRIPTION

In one aspect, a support member for supporting a turbine assembly during installation is provided. The support member includes a platform having a plurality of modular platform components oriented to define an upper surface of the platform. The support member also includes a linear actuator selectively positionable on the upper surface of the platform. The support member further includes a column selectively positionable on the linear actuator. The platform, the linear actuator, and the column are sized to support the turbine assembly.

In another aspect, a method of installing a turbine assembly using a support member is provided. The method includes assembling a platform from a plurality of modular platform components such that the platform components define an upper surface of the platform. The method also includes positioning a linear actuator on the upper surface of the platform, and positioning a column on the linear actuator. The method further includes lifting the turbine assembly onto the column such that a base of the turbine assembly is seated on the column.

In another aspect, a support system for supporting a turbine assembly during installation is provided. The support system includes a pair of first support members and a second support member selectively positionable relative to the first support members in a generally triangular arrangement. The second support member includes a platform, a linear actuator selectively positionable on the platform, and a column selectively positionable on the linear actuator. The platform, the linear actuator, and the column are sized to support the turbine assembly.

DETAILED DESCRIPTION

The following detailed description illustrates exemplary support members and methods of their use by way of example and not by way of limitation. The description should enable one of ordinary skill in the art to make and use the support members, and the description describes several exemplary embodiments of the support members. An exemplary support member is described herein in conjunction with the installation of a turbine assembly. However, it is contemplated that the support member has general application to a broad range of systems in a variety of fields other than turbine assemblies.

Figure 1:
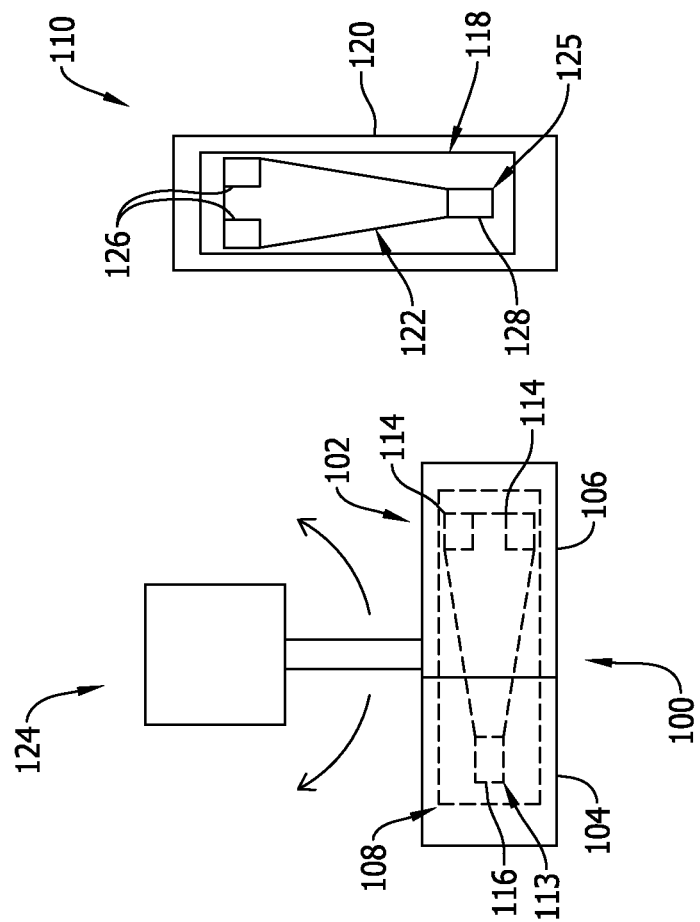
FIG. 1 is a schematic illustration of an exemplary turbine assembly during installation.

FIG. 1 is a schematic illustration of an exemplary turbine assembly 100 during installation at a site 110 (e.g., a power plant). In the exemplary embodiment, turbine assembly 100 is a gas turbine assembly that includes a casing 102 that includes a combustor casing segment 104 and a turbine casing segment 106. A base 108 of turbine assembly 100 is coupled to casing 102 for structurally supporting casing 102 when turbine assembly 100 is transported to site 110 on a vehicle 112 such as, for example, a truck (i.e., base 108 structurally supports casing 102 on vehicle 112 to inhibit casing 102 from bending as a result of vibrations generated when vehicle 112 travels to site 110). Base 108 includes a plurality of base members 113 by which turbine assembly 100 is supported on vehicle 112. In the exemplary embodiment, members 113 include a pair of first base members 114 and a second base member 116 (e.g., a gib) that are arranged in a generally triangular arrangement, wherein first base members 114 are beneath turbine casing segment 106, and second base member 116 is beneath combustor casing segment 104. In other embodiments, turbine assembly 100 may be any suitable type of turbine assembly (e.g., a steam turbine assembly) that is transported to site 110 via any suitable transportation method (e.g., by train), and base 108 may include any suitable number of base members arranged in any suitable orientation that enables turbine assembly 100 to be installed as described herein.

In the exemplary embodiment, a frame 118 is erected from a foundation 120 at site 110, and turbine assembly 100 is mounted on frame 118 when turbine assembly 100 is installed at site 110. However, because of the weight of turbine assembly 100 (e.g., turbine assembly 100 can weigh in excess of four hundred tons in some embodiments), turbine assembly 100 may need to be accurately positioned on frame 118 to prevent damaging frame 118. As such, a support system 122 is temporarily erected at site 110 to facilitate positioning turbine assembly 100 on frame 118. More specifically, turbine assembly 100 is lifted onto support system 122 using a crane 124, and turbine assembly 100 is then transferred from support system 122 onto frame 118 using, for example, a plurality of adjustable brackets (not shown), as described below.

Support system 122 is designed to temporarily position turbine assembly 100 elevated above foundation 120 such that turbine assembly 100 can be maneuvered, aligned, and coupled to foundation 120 with a level of accuracy that is difficult to achieve using only crane 124. In the exemplary embodiment, support system 122 includes a plurality of support members 125. More specifically, in the exemplary embodiment, members 125 include a pair of first support members 126 and a second support member 128 that are arranged in a generally triangular orientation that substantially mirrors the generally triangular arrangement of base members 114 and 116. As such, each first support member 126 is oriented to receive one of the first base members 114, and second support member 128 is oriented to receive second base member 116. In other embodiments, support system 122 may include any suitable number of support members arranged in any suitable orientation that facilitates enabling support system 122 to function as described herein.

Figure 2:
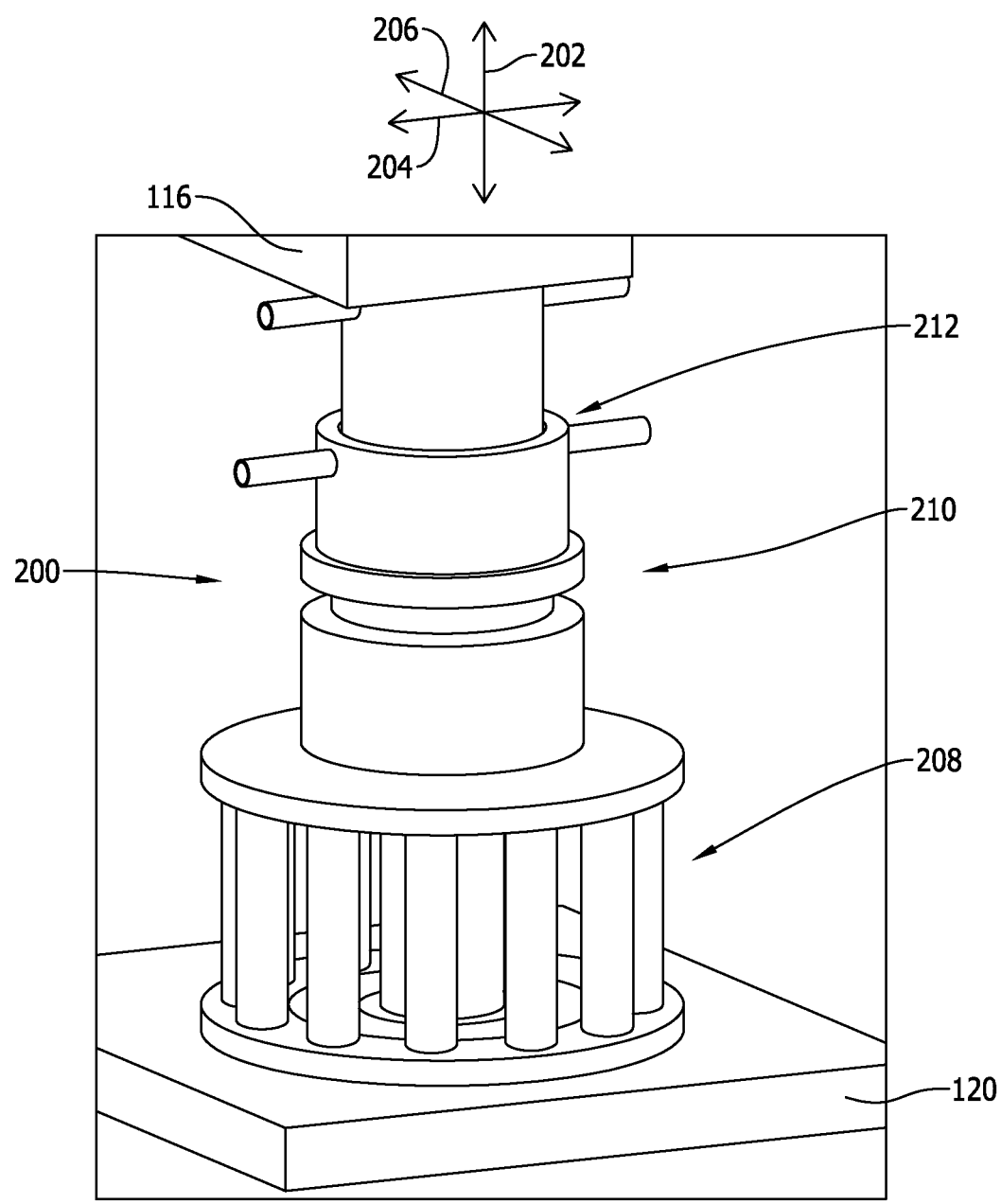
FIG. 2 is a perspective view of an exemplary support member that may be used with a support system when installing the turbine assembly shown in FIG. 1.

FIG. 2 is a perspective view of an exemplary support member 200 that may be used with support system 122 when installing turbine assembly 100 (shown in FIG. 1) (e.g., support member 200 is particularly suited for use as second support member 128 in support system 122). Notably, when turbine assembly 100 is lifted onto support system 122 using crane 124 (shown in FIG. 1), and when turbine assembly 100 is transferred from support system 122 onto foundation 120 (shown in FIG. 1), turbine assembly 100 is maneuverable in three dimensions, namely a vertical (or up-and-down) dimension along an X-axis 202, a first horizontal (or side-to-side) dimension along a Y-axis 204, and a second horizontal (or front-to-rear) dimension along a Z-axis 206 that are oriented perpendicular to one another, such that a three-dimensional space is defined in which turbine assembly 100 is maneuverable during installation.

In the exemplary embodiment, support member 200 includes a platform 208 that is selectively positionable on foundation 120 (or another suitable structure positioned on, or partly embedded in, foundation 120), a linear actuator 210 that is selectively positionable on platform 208, and a column 212 that is selectively positionable on linear actuator 210. When support member 200 is assembled as illustrated, platform 208, linear actuator 210, and column 212 are in a stacked arrangement. Although linear actuator 210 is a hydraulic-type linear actuator (e.g., a pancake lock nut cylinder) in the exemplary embodiment, linear actuator 210 may be of any suitable type that facilitates enabling support member 200 to function as described herein (e.g., linear actuator 210 may be a pneumatic-type linear actuator, or a mechanical-type linear actuator in other embodiments).

Figure 3:
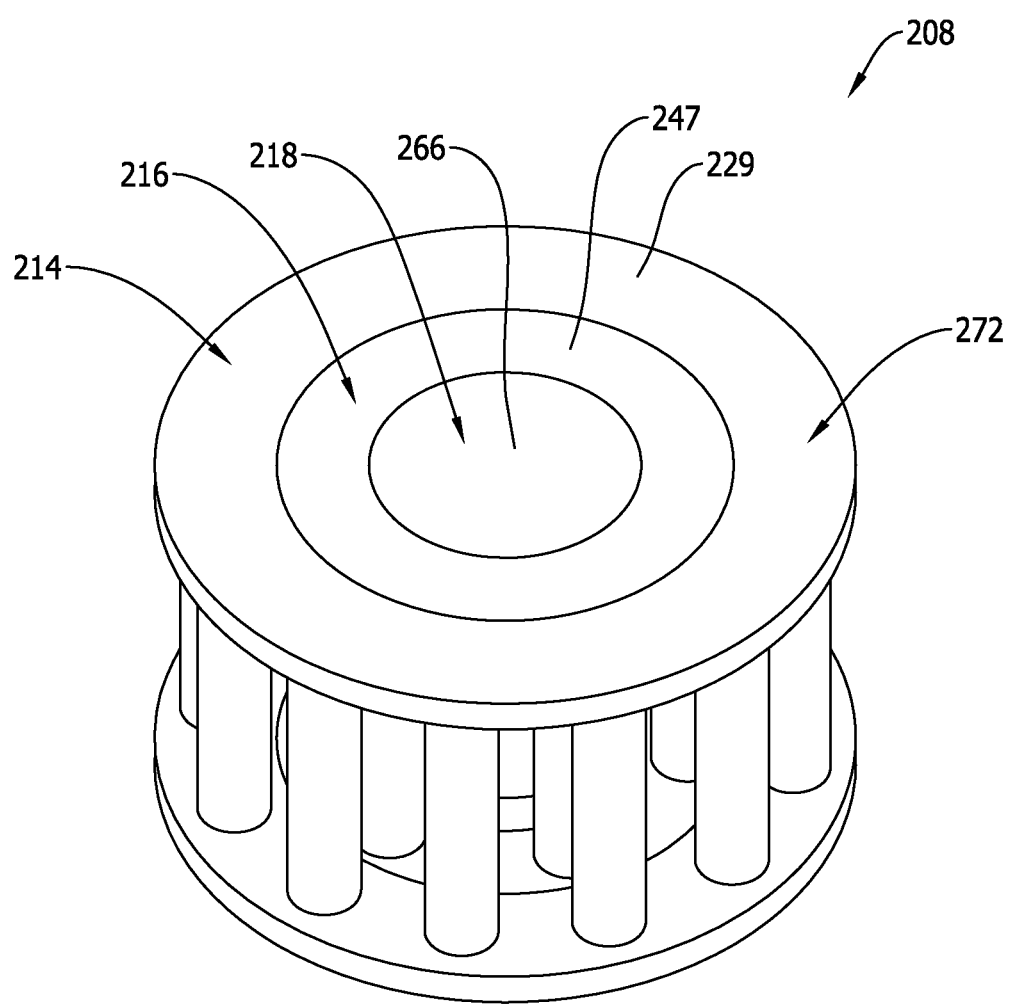
FIG. 3 is a perspective view of a platform used with the support member shown in FIG. 2.
Figure 4:
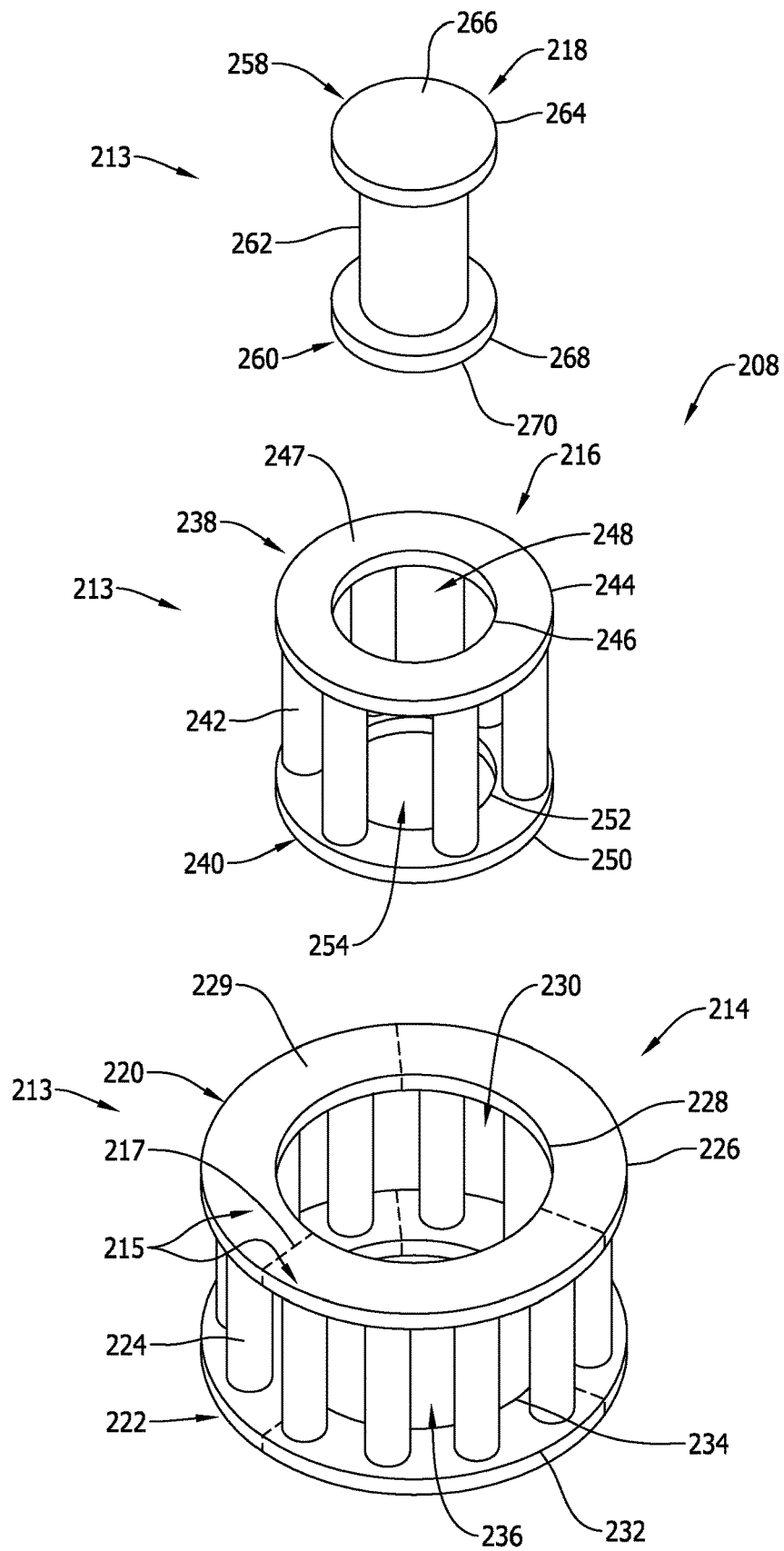
FIG. 4 is an exploded view of the platform shown in FIG. 3.

FIGS. 3 and 4 are respective perspective and exploded views of platform 208. In the exemplary embodiment, platform 208 includes a plurality of modular platform components 213. More specifically, in the exemplary embodiment, components 213 include a first platform component 214, a second platform component 216, and a third platform component 218. Although platform 208 includes three components 213 in the exemplary embodiment, platform 208 may have any suitable number of components 213 that facilitates enabling platform 208 to function as described herein.

In the exemplary embodiment, first platform component 214 includes an upper plate 220, a lower plate 222, and a plurality of spaced-apart posts 224 that extend between plates 220 and 222. Upper plate 220 has an outer edge 226, an inner edge 228, and a substantially planar upper surface 229 that extends therebetween, such that inner edge 228 circumscribes an upper opening 230. Similarly, lower plate 222 includes an outer edge 232 and an inner edge 234 oriented such that inner edge 234 circumscribes a lower opening 236 that is approximately the same size as upper opening 230. Although outer edges 226 and 232 are annular in the exemplary embodiment, outer edges 226 and 232 may have any other suitable shape in other embodiments (e.g., outer edges 226 and 232 may define a polygonal shape in some embodiments). Additionally, although inner edges 228 and 234 are annular in the exemplary embodiment, inner edges 228 and 234 may be segmented and/or may be formed in any other suitable shape, and may define openings 230 and 236 with any other shape in other embodiments (e.g., inner edges 228 and 234 may have a polygonal shape in some embodiments, and/or may define respective openings 230 and 236 that are not the same shape in some embodiments). Moreover, first platform component 214 may include any suitable number of posts 224 that facilitates enabling first platform component 214 to function as described herein.

In the exemplary embodiment, second platform component 216 includes an upper plate 238, a lower plate 240, and a plurality of spaced-apart posts 242 that extend between plates 238 and 240. Upper plate 238 has an outer edge 244, an inner edge 246, and a substantially planar upper surface 247 that extends therebetween, such that inner edge 246 circumscribes an upper opening 248. Similarly, lower plate 240 includes an outer edge 250 and an inner edge 252, such that inner edge 252 circumscribes a lower opening 254 that is approximately the same size as upper opening 248. Although outer edges 244 and 250 are annular in the exemplary embodiment, outer edges 244 and 250 may have any other suitable shape in other embodiments (e.g., outer edges 244 and 250 may have a polygonal shape in some embodiments). Additionally, although inner edges 246 and 252 are annular in the exemplary embodiment, inner edges 246 and 252 may be segmented and/or may be formed in any other suitable shape, and may define openings 248 and 254 with any other shape in other embodiments (e.g., inner edges 246 and 252 may have a polygonal shape in some embodiments, and/or may define respective openings 248 and 254 that are not the same shape in some embodiments). Moreover, second platform component 216 may include any suitable number of posts 242 that facilitates enabling second platform component 216 to function as described herein.

In the exemplary embodiment, third platform component 218 includes an upper plate 258, a lower plate 260, and a post 262 that extend between plates 258 and 260. Upper plate 258 has an outer edge 264 that extends around the periphery of a continuous and substantially planar upper surface 266, and lower plate 260 has an outer edge 268 that extends around the periphery of a substantially planar lower surface 270. Post 262 is generally centrally located between plates 258 and 260 such that third platform component 218 has a generally I-shaped cross-section. In other embodiments, upper surface 266 may not be continuous (e.g., upper surface 266 may have at least one aperture defined therein). Moreover, although third platform component 218 is generally I-shaped in the exemplary embodiment, third platform component 218 may have any other suitable shape in other embodiments (e.g., post 262 may not be generally centrally located between plates 258 and 260, or third platform component 218 may include a plurality of spaced-apart posts 262 between plates 258 and 260).

To assemble platform, second platform component 216 is nested within first platform component 214 by inserting second platform component 216 through upper opening 230 of first platform component 214 and into lower opening 236 of first platform component 214. When fully nested, lower plates 222 and 240 are each substantially aligned, and upper plates 220 and 238 are each substantially aligned. Third platform component 218 is then nested within second platform component 216 by inserting third platform component 218 through upper opening 248 of second platform component 216 and into lower opening 254 of second platform component 216. When third platform component 218 is fully nested, lower plates 240 and 260 are each substantially aligned, and upper plates 238 and 258 are each substantially aligned. Notably, upper surface 229 of first platform component 214 is substantially coplanar with upper surface 247 of second platform component 216 and with upper surface 266 of third platform component 218. As such, upper surfaces 229, 247, and 266 are oriented to collectively define a substantially planar upper surface 272 of platform 208 within the bounds of outer edge 226. In other embodiments, any suitable number of platform components 213 of various shapes and/or sizes may be oriented in any suitable modular arrangement relative to one another to collectively define upper surface 272 (e.g., platform components 213 may be positioned adjacent to one another, but may not be nested within one another, to define upper surface 272).

Figure 5:
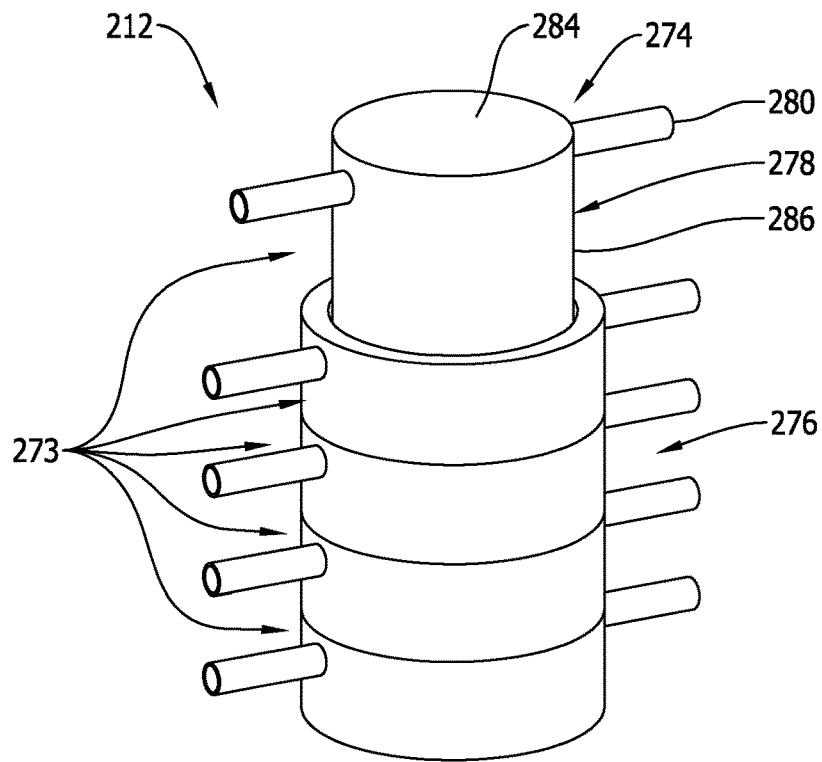
FIG. 5 is a perspective view of a column used with the support member shown in FIG. 2.
Figure 6:
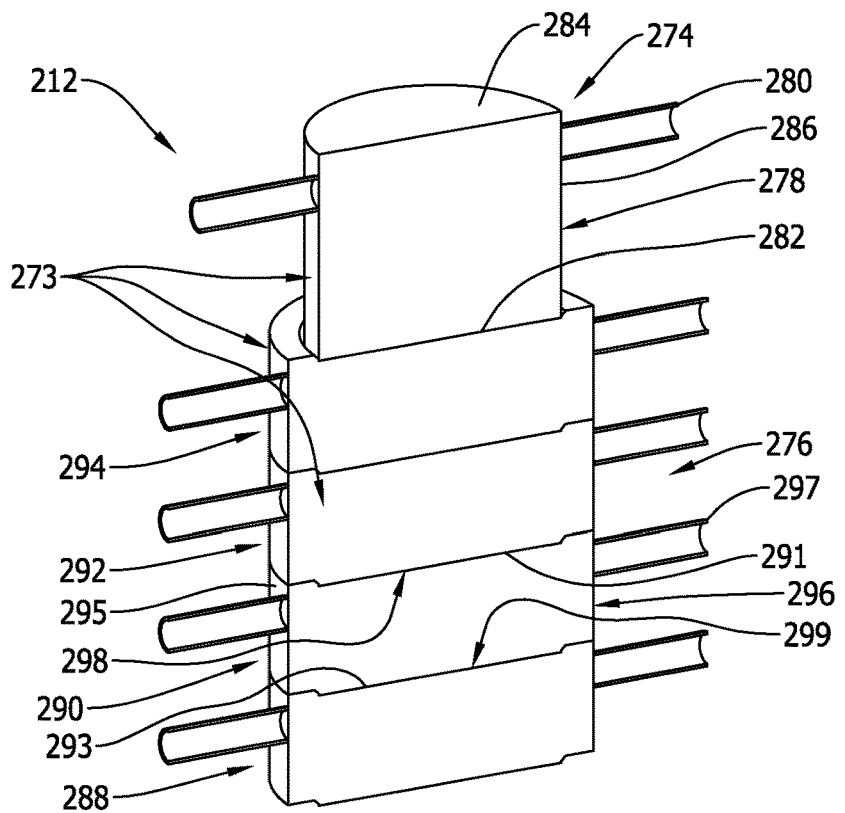
FIG. 6 is a cross-sectional view of the column shown in FIG. 5.

FIGS. 5 and 6 are respective perspective and cross-sectional views of column 212. In the exemplary embodiment, column 212 includes a plurality of modular column components 273. More specifically, in the exemplary embodiment, components 273 include an upper component 274 and at least one base component 276 beneath upper component 274. Upper component 274 has a generally tubular body 278 and a pair of handles 280 extending outward from body 278. More specifically, body 278 has a lower surface 282, an upper surface 284, and a side surface 286 from which handles 280 extend. Lower and upper surfaces 282 and 284, respectively, are each substantially planar, and are oriented substantially parallel to one another. Alternatively, lower surface 282 may be contoured or may be skewed relative to upper surface 284 (e.g., lower surface 282 may not be oriented substantially parallel to upper surface 284). Moreover, although body 278 is generally cylindrical (e.g., surfaces 282 and 284 are substantially circular) in the exemplary embodiment, body 278 may have any other suitable shape in other embodiments (e.g., surfaces 282 and 284 may be square, rectangular, or triangular in other embodiments).

In the exemplary embodiment, column 212 includes a plurality of base components 276. More specifically, in the exemplary embodiment, components 276 include a first base component 288, a second base component 290, a third base component 292, and a fourth base component 294. In the exemplary embodiment, base components 276 are the same size and shape as each other and, thus, their respective positions within column 212 are interchangeable. For example, in the exemplary embodiment, the relative positions of first base component 288 and fourth base component 294 could be switched, and/or the relative positions of second base component 290 and third base component 292 could be switched. More specifically, each base component 276 has a disc-shaped body 296 and a pair of handles 297 that extend outward from body 296. Body 296 has an upper surface 298, a lower surface 299, and a side surface 295 from which handles 297 extend. Lower surface 299 includes a protruding central region 293 that is substantially the same size and shape, and/or is contoured similarly, as lower surface 282 of upper component 274. Upper surface 298 is formed with a recessed central region 291 that is sized to receive (and thereby engage) lower surface 282 of upper component 274 and, therefore, lower surface 299 of each base component 276 in a mating relationship. Alternatively, base components 276 may be sized, shaped, and/or contoured in any suitable manner that facilitates enabling base components 276 to be interchangeably positioned beneath upper component 274 in the manner set forth herein. Moreover, although column 212 includes five components in the exemplary embodiment, column 212 may have any other number of components that facilitates enabling column 212 to function as described herein.

Figure 7:
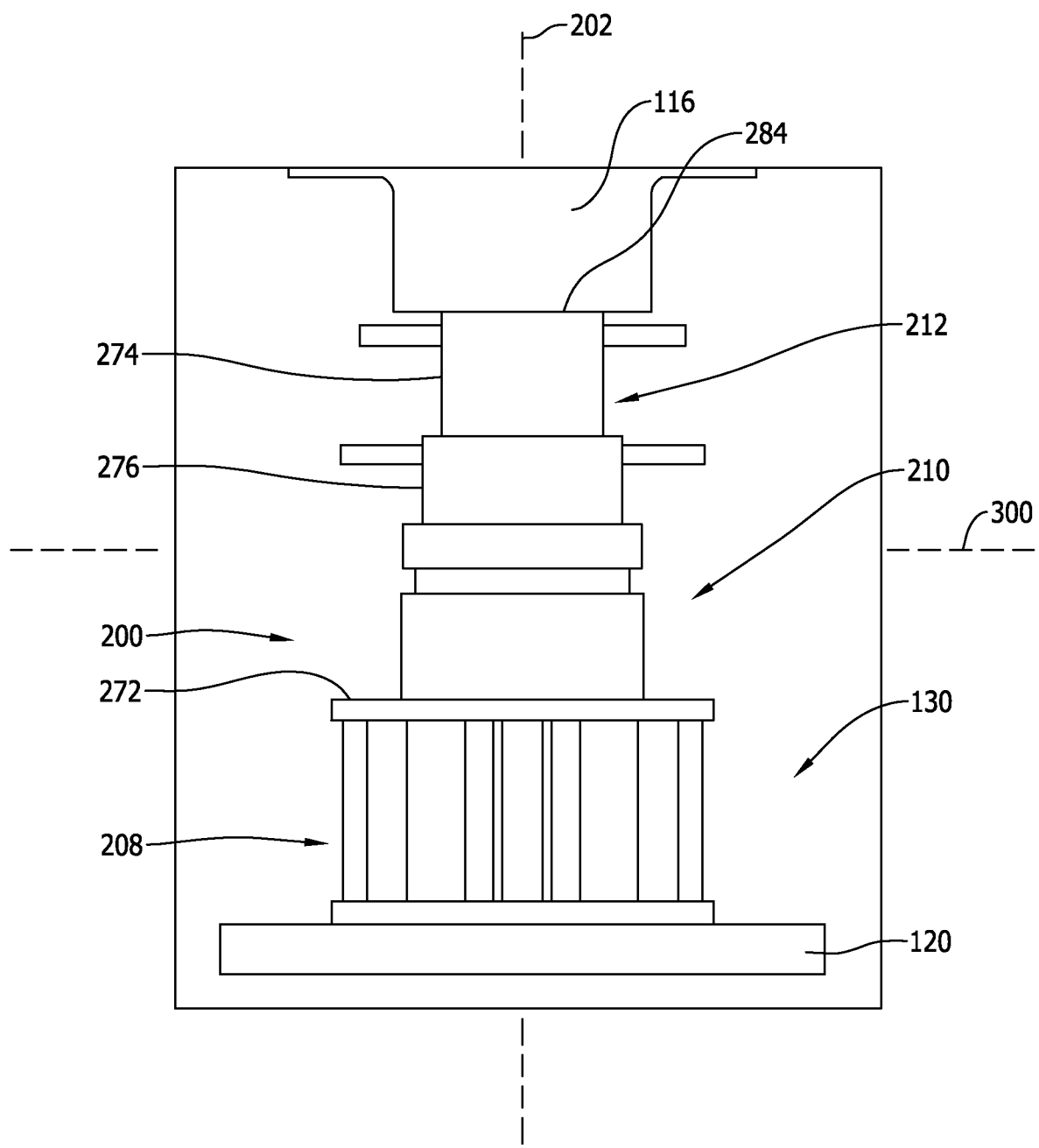
FIG. 7 is a rear elevational view of the support member shown in FIG. 2 as it is being used to install the turbine assembly shown in FIG. 1.

FIG. 7 is a rear elevational view of support member 200 as it is being used to install turbine assembly 100 (shown in FIG. 1) (i.e., after turbine assembly 100 has already been lifted onto support system 122 using crane 124 during the installation of turbine assembly 100 at site 110, as shown in FIG. 1). In the exemplary embodiment, support member 200 functions as second support member 128 (shown in FIG. 1) of support system 122 (also shown in FIG. 1). When turbine assembly 100 is being lifted onto support system 122 using crane 124, second base member 116 of base 108 (shown in FIG. 1) needs to be accurately aligned with support member 200 along a plane 300 oriented substantially parallel to Y-axis 204 (shown in FIG. 2) and Z-axis 206 (also shown in FIG. 2). To facilitate such alignment, support member 200 is assembled on foundation 120 by a person (not shown) standing beneath turbine assembly 100 when turbine assembly 100 is suspended above support system 122 using crane 124.

Because platform 208 is designed to support the weight of turbine assembly 100, platform 208 may be fabricated from a metal material such that that the overall weight of platform 208 is difficult for one person (or multiple people) to lift by hand. However, because platform 208 is modular as described above, platform 208 is designed to be lifted and positioned on foundation 120 one component at a time, and without the assistance of power lifting equipment such as a crane (not shown). Platform 208 can thus be moved by hand into position beneath second base member 116 along plane 300 when turbine assembly 100 is suspended above support system 122, such that platform components 213 (shown in FIG. 4) are arranged in a nested manner and oriented as shown in FIG. 3 to collectively define upper surface 272 of platform 208 beneath second base member 116. Optionally, to further facilitate handling platform components 213, at least one platform component 213 (e.g., first platform component 214) may have a plurality of sections 215 that can be individually lifted and seated in abutment with one another at respective joints 217, as shown in FIG. 4.

With turbine assembly 100 suspended above platform 208 using crane 124 such that platform 208 is aligned with second base member 116 along plane 300, linear actuator 210 is then seated on upper surface 272 underneath second base member 116. Notably, because it can be difficult for the operator of crane 124 to align second base member 116 over linear actuator 210 with accuracy, the person assembling support member 200 can manually move linear actuator 210 to any location on upper surface 272 by visually aligning linear actuator 210 with second base member 116 along plane 300 (e.g., linear actuator 210 can have an off-center location on upper surface 272 in some instances). In that regard, the modular nature of platform 208 facilitates manually increasing or decreasing the size of upper surface 272 as appropriate, which in turn facilitates increasing or decreasing the range for moving linear actuator 210 into alignment with second base member 116. In other words, the modular nature of platform 208 facilitates making platform 208 large enough to permit moving linear actuator 210 to various locations on upper surface 272 in a manner that accommodates misalignment of second base member 116 by the operator of crane 124, while still allowing the person assembling support member 200 to move platform 208 by hand.

After linear actuator 210 is positioned beneath second base member 116, column 212 is positioned on linear actuator 210 to increase the height of support member 200 along X-axis 202, thereby reducing the distance that turbine assembly 100 needs to be lowered in order for second base member 116 to contact support member 200. Because column 212 is designed to support the weight of turbine assembly 100, the overall weight of column 212 may make column 212 difficult for one person (or multiple people) to lift by hand. However, like platform 208, column 212 has a modular design as described above, and therefore can be lifted into place one component at a time, without the assistance of power lifting equipment such as a crane (not shown). More specifically, base component(s) 276 of column 212 are first positioned on linear actuator 210, and upper component 274 of column 212 is then positioned on base component(s) 276.

If linear actuator 210 and column 212 subsequently need to be repositioned on upper surface 272 (e.g., if the operator of crane 124 moves turbine assembly 100 out of alignment), linear actuator 210 and column 212 can be repositioned on upper surface 272 as desired. For example, linear actuator 210 and column 212 can be repositioned together as a single unit (e.g., by sliding linear actuator 210 along upper surface 272 with column 212 seated on linear actuator 210), or linear actuator 210 and column 212 can be repositioned individually as separate units (e.g., column 212 can be disassembled and removed from linear actuator 210 to lift or slide linear actuator 210 along upper surface 272, and column 212 can then be reassembled on linear actuator 210 at the new position). Moreover, the number of base components 276 that are positioned beneath upper component 274 is selectable to suit a desired height of support member 200 along X-axis 202 (i.e., more base components 276 may be added/removed to increase/decrease the height of support member 200 as desired). For example, in one embodiment, column 212 may be assembled without any base components 276 (i.e., upper component 274 may be seated directly on linear actuator 210). In other embodiments, column 212 may be assembled to have only one base component 276, or column 212 may be assembled with more than four base components 276. Alternatively, support member 200 may be assembled without column 212 (i.e., without upper component 274 and without base component(s) 276) such that linear actuator 210 is positioned at the top of support member 200 for directly engaging turbine assembly 100 (e.g., base 108), as set forth in more detail below.

After support member 200 is fully assembled in alignment beneath second base member 116, turbine assembly 100 is then lowered toward support system 122 until second base member 116 contacts upper surface 284 of upper component 274. With turbine assembly 100 resting on support member 200 in this manner, turbine assembly 100 (e.g., base 108) can then be engaged from the front/rear along Z-axis 206, from the side(s) along Y-axis 204, and/or from underneath along X-axis 202 using a plurality of adjustable brackets (e.g., suitable fixators) (not shown), and support member 200 can then be disassembled, partly lowered (via linear actuator 210), or otherwise removed from contacting second base member 116.

With support member 200 no longer supporting turbine assembly 100, the adjustable brackets are then operable to further maneuver turbine assembly 100 while it is elevated above frame 118 (shown in FIG. 1), and then to seat turbine assembly 100 on frame 118 (e.g., by shifting turbine assembly 100 forward-and-rearward along Z-axis 206 and/or shifting turbine assembly 100 side-to-side along Y-axis 204, and then lowering turbine assembly 100 onto frame 118 along X-axis 202). Notably, by seating turbine assembly 100 on support system 122 (e.g., on support member 200) before engaging turbine assembly 100 with the adjustable brackets, the adjustable brackets can be operated to engage turbine assembly 100 (e.g., base 108) while turbine assembly 100 is at rest, as opposed to engaging turbine assembly 100 while turbine assembly 100 is suspended using crane 124 alone. Thus, support system 122 (e.g., support member 200) facilitates reducing the risk of turbine assembly 100 being released by crane 124 onto the adjustable brackets with turbine assembly 100 misaligned relative to the adjustable brackets, thereby damaging the adjustable brackets beneath the weight of turbine assembly 100. Such a scenario could cause significant delay in the installation process by necessitating removal of turbine assembly 100, repair of the adjustable brackets, and/or repositioning of turbine assembly 100.

The methods and systems described herein provide a support member for use when positioning heavy objects with accuracy and precision. For example, the methods and systems provide a support member for use in elevating a turbine assembly during installation. More specifically, the methods and systems provide a support member that can be assembled and repositioned beneath a turbine assembly, without having to lift the support member into position using power lifting equipment, such as a crane. Additionally, the methods and systems facilitate accurately positioning a turbine assembly on a support system using a crane, such that the turbine assembly can be engaged by adjustable brackets for further maneuvering of the turbine assembly and seating of the turbine assembly on its frame. Thus, the methods and systems facilitate installing a turbine assembly on its frame with less risk of damaging the adjustable brackets used to shift the turbine assembly into position relative to the frame. As such, the methods and systems facilitate reducing the time needed to install a turbine assembly by, for example, reducing the risk of delays that may otherwise occur when improperly positioning the turbine assembly on its adjustable brackets and/or its frame. The methods and systems therefore facilitate reducing the cost of installing a turbine assembly.

Exemplary embodiments of methods and systems are described above in detail. The methods and systems described herein are not limited to the specific embodiments described herein, but rather, steps of the methods and components of the systems may be utilized independently and separately from other method steps and system components described herein. For example, the methods and systems described herein may have other applications not limited to practice with turbine assemblies. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A method of installing a turbine assembly on a foundation using a support member, the support member including a platform, a linear actuator, and a column, said method comprising:
    assembling the platform from a plurality of modular platform components that each include an upper plate, each upper plate comprising a plate upper surface, wherein the upper plates are oriented to collectively define an upper surface of the platform as a coplanar arrangement of the plate upper surfaces;
    positioning the linear actuator at a selected location from among a plurality of locations on the upper surface of the platform, the location selected to align with a base member of the turbine assembly;
    positioning the column on the linear actuator;
    lifting the turbine assembly onto the column such that the base member of the turbine assembly is seated on the column;
    affixing the turbine assembly to the foundation while the turbine assembly is seated on the column; and
    removing the support member from underneath the base.

2. The method in accordance with claim 1, further comprising nesting one of the platform components within another of the platform components.

3. The method in accordance with claim 2, further comprising assembling one of the nested platform components from a plurality of sections.

4. The method in accordance with claim 1, further comprising assembling the column from a plurality of column components.

5. The method in accordance with claim 4, further comprising stacking a plurality of base components of the column beneath an upper component of the column.

6. The method in accordance with claim 4, further comprising engaging the column components with one another in a mating relationship.

7. The method in accordance with claim 1, further comprising lifting the column using a handle of the column.

8. The method in accordance with claim 1, wherein positioning a linear actuator on the upper surface of the platform comprises positioning a hydraulic linear actuator on the upper surface of the platform.

9. The method in accordance with claim 1, further comprising lifting the turbine assembly onto the column using a crane.

10. The method in accordance with claim 1, wherein the base of the turbine assembly has a plurality of base members that include a pair of first base members and a second member, wherein the pair of first base members and the second base member are arranged in a triangular arrangement, said method further comprising:
    positioning the support member and two additional support members in a corresponding triangular arrangement that mirrors the triangular arrangement of the base members.

11. The method in accordance with claim 1, wherein positioning the linear actuator further comprises adjusting, while the turbine assembly is suspended above the platform, a position of the linear actuator along the upper surface of the platform to the selected location to align the linear actuator directly beneath the base member.

12. The method in accordance with claim 1, wherein removing the support member comprises lowering, after affixing the turbine assembly to the foundation, the linear actuator such that the base of the turbine assembly is no longer seated on the column.

* * * * *